United States Patent
Tiruveedhula et al.

(10) Patent No.: US 10,291,532 B1
(45) Date of Patent: May 14, 2019

(54) ENABLING INTERCONNECTION BETWEEN ETHERNET VIRTUAL PRIVATE NETWORKS (EVPNS) AND PROVIDER BACKBONE BRIDGING EVPNS (PBB-EVPNS)

(71) Applicant: Juniper Networks, Inc., Sunnyvale, CA (US)

(72) Inventors: Maruthi Kishore Tiruveedhula, Nashua, NH (US); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 49 days.

(21) Appl. No.: 15/637,521

(22) Filed: Jun. 29, 2017

(51) Int. Cl.
| | | |
|---|---|---|
| *H04L 12/66* | (2006.01) | |
| *H04L 12/803* | (2013.01) | |
| *H04L 12/721* | (2013.01) | |
| *H04L 12/46* | (2006.01) | |
| *H04L 12/713* | (2013.01) | |
| *H04L 29/12* | (2006.01) | |

(52) U.S. Cl.
CPC .......... *H04L 47/125* (2013.01); *H04L 12/462* (2013.01); *H04L 12/4641* (2013.01); *H04L 45/586* (2013.01); *H04L 45/66* (2013.01); *H04L 61/6022* (2013.01)

(58) Field of Classification Search
CPC ..... H04L 45/66; H04L 45/50; H04L 12/4641; H04L 12/462; H04L 61/6022; H04L 45/04; H04L 41/12; H04L 45/02; H04L 69/08; H04L 12/4633; H04L 12/4662; H04L 12/66; H04L 45/16; H04L 69/18; H04L 12/4625; H04L 45/08
See application file for complete search history.

(56) References Cited

U.S. PATENT DOCUMENTS

| | | | | |
|---|---|---|---|---|
| 10,033,636 B1 * | 7/2018 | Zhang | ............. | H04L 45/74 |
| 2013/0301472 A1 * | 11/2013 | Allan | ............. | H04L 45/66 |
| | | | | 370/254 |

OTHER PUBLICATIONS

Ali Sajassi et al., "Internet-Draft Intended Status: Standard Track", https://www.ietf.org/archive/id/draft-ietf-bess-evpn-vpls-seamless-integ-00.txt, Aug. 20, 2015, 10 pages.

* cited by examiner

*Primary Examiner* — Awet Haile
(74) *Attorney, Agent, or Firm* — Harrity & Harrity, LLP

(57) ABSTRACT

A network device may receive first route information from an Ethernet virtual private network (EVPN) device and/or a provider backbone bridging EVPN (PBB-EVPN) device. The network device may generate second route information based on the first route information. The network device may provide the second route information to permit network traffic to be transferred between the EVPN device and the PBB-EVPN device. The network device may receive the network traffic to be transferred between the EVPN device and the PBB-EVPN device after providing the second route information. The network device may modify the network traffic to be compatible with the EVPN device or the PBB-EVPN device after receiving the network traffic. The network device may provide the network traffic between the EVPN device and the PBB-EVPN device after modifying the network traffic.

20 Claims, 8 Drawing Sheets

ENABLING INTERCONNECTION BETWEEN ETHERNET VIRTUAL PRIVATE NETWORKS (EVPNS) AND PROVIDER BACKBONE BRIDGING EVPNS (PBB-EVPNS)

BACKGROUND

An Ethernet virtual private network (EVPN) may allow a group of dispersed client sites (e.g., included in a virtual local area network (VLAN)) to be connected using a data link layer (e.g., layer 2) virtual bridge. An EVPN may include one or more customer edge devices connected to one or more provider edge devices. Provider backbone bridging EVPN (PBB-EVPN) implements PBB (i.e., the Institute of Electrical and Electronics Engineers (IEEE) 802.1ah) protocols in combination with EVPN protocols to reduce route information signaling by aggregating customer/client media access control (C-MAC) addresses using a provider backbone MAC (B-MAC) address.

SUMMARY

According to some possible implementations, a device may include one or more processors that may receive, from an Ethernet virtual private network (EVPN) device, first capability information that identifies that the EVPN device is EVPN capable; receive, from a provider backbone bridging EVPN (PBB-EVPN) device, second capability information that identifies that the PBB-EVPN device is PBB-EVPN capable; receive first route information from the EVPN device and/or the PBB-EVPN device; generate second route information based on the first route information and based on the first capability information and the second capability information; provide the second route information to permit network traffic to be transferred between the EVPN device and the PBB-EVPN device; receive the network traffic to be transferred between the EVPN device and the PBB-EVPN device after providing the second route information; modify the network traffic, based on the first capability information and the second capability information, after receiving the network traffic; and provide the network traffic between the EVPN device and the PBB-EVPN device after modifying the network traffic.

According to some possible implementations, a non-transitory computer-readable medium may store one or more instructions that, when executed by one or more processors of a network device, cause the one or more processors to receive first route information from an Ethernet virtual private network (EVPN) device and/or a provider backbone bridging EVPN (PBB-EVPN) device; generate second route information based on the first route information; provide the second route information to permit network traffic to be transferred between the EVPN device and the PBB-EVPN device; receive the network traffic to be transferred between the EVPN device and the PBB-EVPN device after providing the second route information; modify the network traffic to be compatible with the EVPN device or the PBB-EVPN device after receiving the network traffic; and provide the network traffic between the EVPN device and the PBB-EVPN device after modifying the network traffic.

According to some possible implementations, a method may include receiving, by a device, first route information from an Ethernet virtual private network (EVPN) device and a provider backbone bridging EVPN (PBB-EVPN) device; generating, by the device, second route information based on the first route information; providing, by the device, the second route information to permit network traffic to be transferred between the EVPN device and the PBB-EVPN device; receiving, by the device, the network traffic to be transferred between the EVPN device and the PBB-EVPN device after providing the second route information; modifying, by the device, the network traffic after receiving the network traffic; and providing, by the device, the network traffic to the EVPN device or to the PBB-EVPN device after modifying the network traffic.

DETAILED DESCRIPTION

Figure 1A:
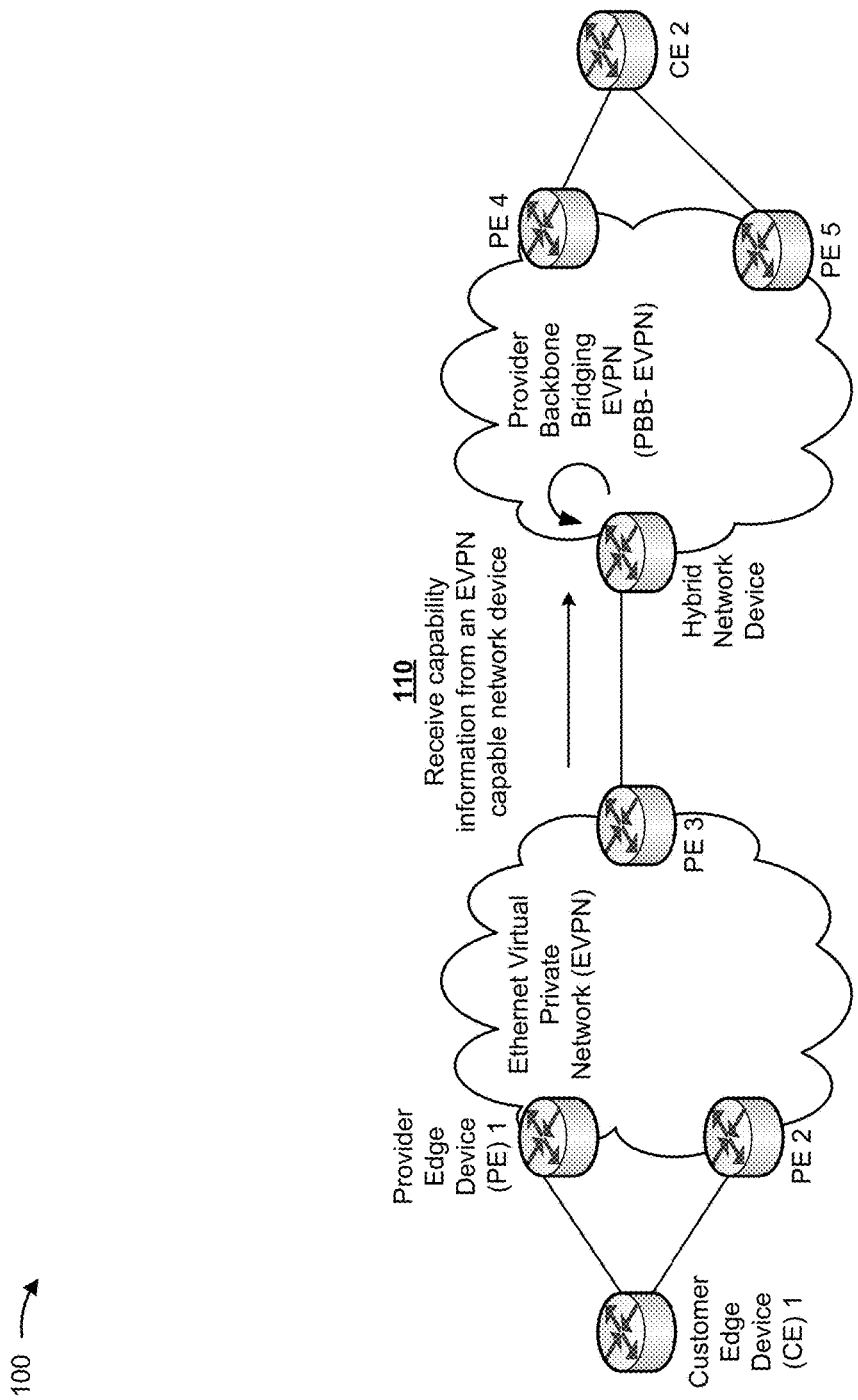
FIGS. 1A-1E are diagrams of an overview of an example implementation described herein.

The following detailed description of example implementations refers to the accompanying drawings. The same reference numbers in different drawings may identify the same or similar elements.

EVPN capable network devices implement EVPN services. For example, an EVPN instance (EVI) includes a set of customer edge devices (CEs) that are connected to provider edge devices (PEs) that allow data link layer bridged connectivity between the CEs. As used herein, an EVPN capable network device (e.g., an EVPN PE) may refer to a network device that is capable of implementing an EVPN, capable of providing route information to other network devices of an EVPN, and/or capable of transferring network traffic between network devices of an EVPN.

A CE is located on an edge of a customer premises, and communicates with a PE (or a set of PEs) to gain access to a service provider's core network. Additionally, a CE communicates with a set of endpoint devices via a local area network (e.g., a VLAN) to provide the endpoint devices with connectivity to other endpoint devices of other VLANs of the EVI.

EVPN PEs of an EVI exchange route information (e.g., network layer reachability information (NLRI)) to enable network traffic to be transferred between endpoint devices of respective VLANs of the EVI. For example, the EVPN PEs exchange route information, such as Ethernet auto-discovery routes (e.g., route type 1 information), media access control (MAC)/Internet Protocol (IP) advertisement routes (e.g., route type 2 information), inclusive multicast Ethernet tag routes (e.g., route type 3 information), Ethernet segment routes (e.g., route type 4 information), or the like. Additionally, the EVPN PEs store the route information in respective data structures (e.g., routing tables, forwarding tables, flow tables, virtual routing and forwarding (VRF) tables, or the like).

A first EVPN PE of an EVI determines, using data plane learning techniques, customer MAC (C-MAC) addresses of endpoint devices that are reachable via a CE that is connected to the first EVPN PE. Additionally, the first EVPN PE provides, to other EVPN PEs of the EVI using control plane signaling, route information (i.e., route type 2 information) that includes the C-MAC addresses.

The other EVPN PEs receive the route information, and determine C-MAC addresses of endpoint devices that are reachable via the first EVPN PE. Additionally, a second EVPN PE receives unicast network traffic from a CE that is connected to the second EVPN PE, and searches a data structure using a destination C-MAC address included in the unicast network traffic.

In situations where the second EVPN PE identifies an entry in the data structure using the destination C-MAC address (e.g., the destination C-MAC address is a known C-MAC address), then the second EVPN PE provides the unicast network traffic to the first EVPN PE (i.e., the first EVPN PE that provided the route type 2 information to the second EVPN PE).

An EVPN PE transfers broadcast, unknown unicast, or multicast (BUM) network traffic. For example, a first EVPN PE receives, from a CE, multicast or broadcast network traffic that includes a VLAN identifier (VLAN ID). A VLAN ID includes information that identifies a particular VLAN associated with an EVI.

The first EVPN PE searches a data structure using a VLAN ID included in the BUM network traffic, and identifies a set of EVPN PEs to which copies of the BUM network traffic are to be provided (e.g., EVPN PEs that provided route type 3 information to the first EVPN PE). Additionally, in situations where the first EVPN PE does not identify an entry for a destination C-MAC address included in unicast network traffic (e.g., the destination C-MAC address is an unknown C-MAC address), the first EVPN PE provides copies of the unicast network traffic to other EVPN PEs of the EVI.

EVPN capable network devices exchange route information via control plane signaling, thereby enabling unicast network traffic and BUM network traffic to be transferred between endpoint devices of VLANs associated with an EVI.

In some cases, network devices may be PBB-EVPN capable network devices (e.g., PBB-EVPN PEs). As used herein, a PBB-EVPN capable network device may refer to a network device that is capable of implementing a PBB-EVPN, capable of providing route information to other network devices of a PBB-EVPN, and/or capable of transferring network traffic between network devices of a PBB-EVPN.

A first PBB-EVPN PE of an EVI provides, to other PBB-EVPN PEs of an EVI using control plane signaling, route type 2 information that identifies a provider backbone MAC (B-MAC) address associated with the first PBB-EVPN PE. Additionally, the other PBB-EVPN PEs of the EVI identify, using data plane learning techniques, C-MAC addresses that are reachable via the first PBB-EVPN PE. Further still, the other PBB-EVPN PEs store, in respective data structures, entries that map the C-MAC addresses to the B-MAC address of the first PBB-EVPN PE.

A second PBB-EVPN PE receives, from a CE that is connected to the second PBB-EVPN PE, unicast network traffic that includes a destination C-MAC address. The second PBB-EVPN PE searches a data structure, using the destination C-MAC address, and identifies that the first PBB-EVPN PE is the next-hop for the destination C-MAC address. Further still, the second PBB-EVPN PE adds PBB information (e.g., information that identifies the B-MAC address of the first PBB-EVPN PE) to the unicast network traffic, and provides the unicast network traffic to the first PBB-EVPN PE after adding the PBB information. The first PBB-EVPN PE receives the unicast network traffic, removes the PBB information, and provides the unicast network traffic to a CE that is connected to the first PBB-EVPN PE.

In other cases, a first PBB-EVPN PE of an EVI provides, to other PBB-EVPN PEs of the EVI using control plane signaling, route type 3 information that identifies a service instance identifier (I-SID). Additionally, the other PBB-EVPN PEs of the EVI identifies, using data plane learning techniques, VLAN IDs associated with CEs that are connected to the first PBB-EVPN PE. Further still, the other PBB-EVPN PEs store, in respective data structures, entries that map the VLAN IDs to the A second PBB-EVPN PE receives, from a CE that is connected to the second PBB-EVPN PE, BUM network traffic that includes a VLAN ID, and identifies that the first PBB-EVPN PE is the next-hop based on an entry in a data structure. Additionally, the second PBB-EVPN PE adds PBB information (e.g., information that identifies the I-SID) to the BUM network traffic, and provides, to the first PBB-EVPN PE, the BUM network traffic after adding the PBB information. The first PBB-EVPN PE receives the BUM network traffic, removes the PBB information, and forwards the BUM network traffic to CEs associated with the VLAN ID.

PBB-EVPN protocols enable PBB-EVPN capable network devices to reduce an amount of control plane signaling associated with the exchange of route information as compared to EVPN protocols. For example, instead of providing, via control plane signaling, route information that identifies every C-MAC address and/or VLAN that is reachable via a PBB-EVPN PE, the PBB-EVPN PE provides, via control plane signaling, route information that identifies a B-MAC address and/or an I-SID associated with the PBB-EVPN PE. Further, other PBB-EVPN PEs learn, using data plane learning techniques, C-MAC addresses and/or VLANs that are reachable via the PBB-EVPN PE, and map the C-MAC addresses and/or VLAN IDs of the VLANs to the B-MAC address and I-SID respectively. As such, PBB-EVPN protocols reduce an amount of control plane signaling, and reduce an amount of route information that is stored by PEs.

In some cases, a network service provider might configure some network devices to be EVPN capable network devices and/or might configure other network devices to be PBB-EVPN capable network devices. In such cases, endpoint devices of VLANs that are connected via one or more networks associated with the network service provider might be incapable of communicating with other endpoint devices of other VLANs. For example, assume that a first CE is connected to an EVPN PE, and that a second CE is connected to a PBB-EVPN PE. In such cases, endpoint devices connected to the first CE might be incapable of communicating with endpoint devices connected to the second CE (e.g., because route information is not exchanged between the PBB-EVPN PE and the EVPN PE, because the PBB-EVPN PE and the EVPN PE are not implementing the same protocol, or the like).

As such, a network service provider might be required to configure or re-configure a significant number of network devices in order to enable interconnection between different customer sites that are connected to EVPN PEs and PBB-EVPN PEs, respectively. Additionally, such configuration and/or re-configuration may prove time intensive, error prone, etc.

Some implementations described herein provide a hybrid network device that is both EVPN capable and PBB-EVPN capable. In some implementations, the hybrid network device may receive capability information from an EVPN capable network device and a PBB-EVPN capable network device, and receive first route information from the EVPN capable network device and the PBB-EVPN capable network device. Additionally, the hybrid network device may generate second route information based on the capability information and the first route information to permit reachability information, associated with the first route information, to be transferred between the EVPN capable network device and the PBB-EVPN capable network device.

In some implementations, the hybrid network device may provide the second route information to the EVPN capable network device and the PBB-EVPN capable network device after generating the second route information. Additionally, the hybrid network device may receive network traffic to be transferred between the EVPN capable network device and the PBB-EVPN capable network device, modify the network traffic to permit the network traffic to be transferred between the EVPN capable network device and the PBB-EVPN capable network device, and provide the network traffic after modifying the network traffic.

In this way, some implementations described herein enable interconnection between EVPNs and PBB-EVPNs. Additionally, some implementations described herein reduce an amount of configuration and/or re-configuration of network devices associated with EVPNs and PBB-EVPNs. In other words, some implementations described herein permit EVPN PEs and PBB-EVPN PEs to exchange route information and network traffic, despite the EVPN PEs and the PBB-EVPN PEs implementing different protocols.

Some implementations described herein improve network performance by enabling interconnection between network devices that otherwise might not be capable of communicating. Additionally, some implementations described herein conserve network resources by reducing situations where network traffic, that might ultimately be dropped, is provided between EVPNs and PBB-EVPNs. In this way, some implementations described herein conserve processor and/or memory resources of network devices and conserve network resources.

FIGS. 1A-1E are diagrams of an overview of an example implementation 100 described herein. As shown in FIG. 1A, example implementation 100 may include an Ethernet virtual private network (EVPN) that includes a set of provider edge devices (e.g., PE 1, PE 2, and PE 3), and a customer edge device (e.g., CE 1). As further shown in FIG. 1A, example implementation 100 may include a provider backbone bridging EVPN (PBB-EVPN) that includes a set of provider edge devices (e.g., PE 4 and PE 5), a hybrid network device, and a customer edge device (e.g., CE 2).

As shown in FIG. 1A, and by reference number 110, the hybrid network device may receive capability information from an EVPN capable network device (e.g., PE 3). For example, the capability information may identify that PE 3 is capable of implementing an EVPN, is capable of exchanging EVPN signaling information, is capable of providing network traffic associated with an EVPN, is implementing EVPN protocols, or the like.

Figure 1B:
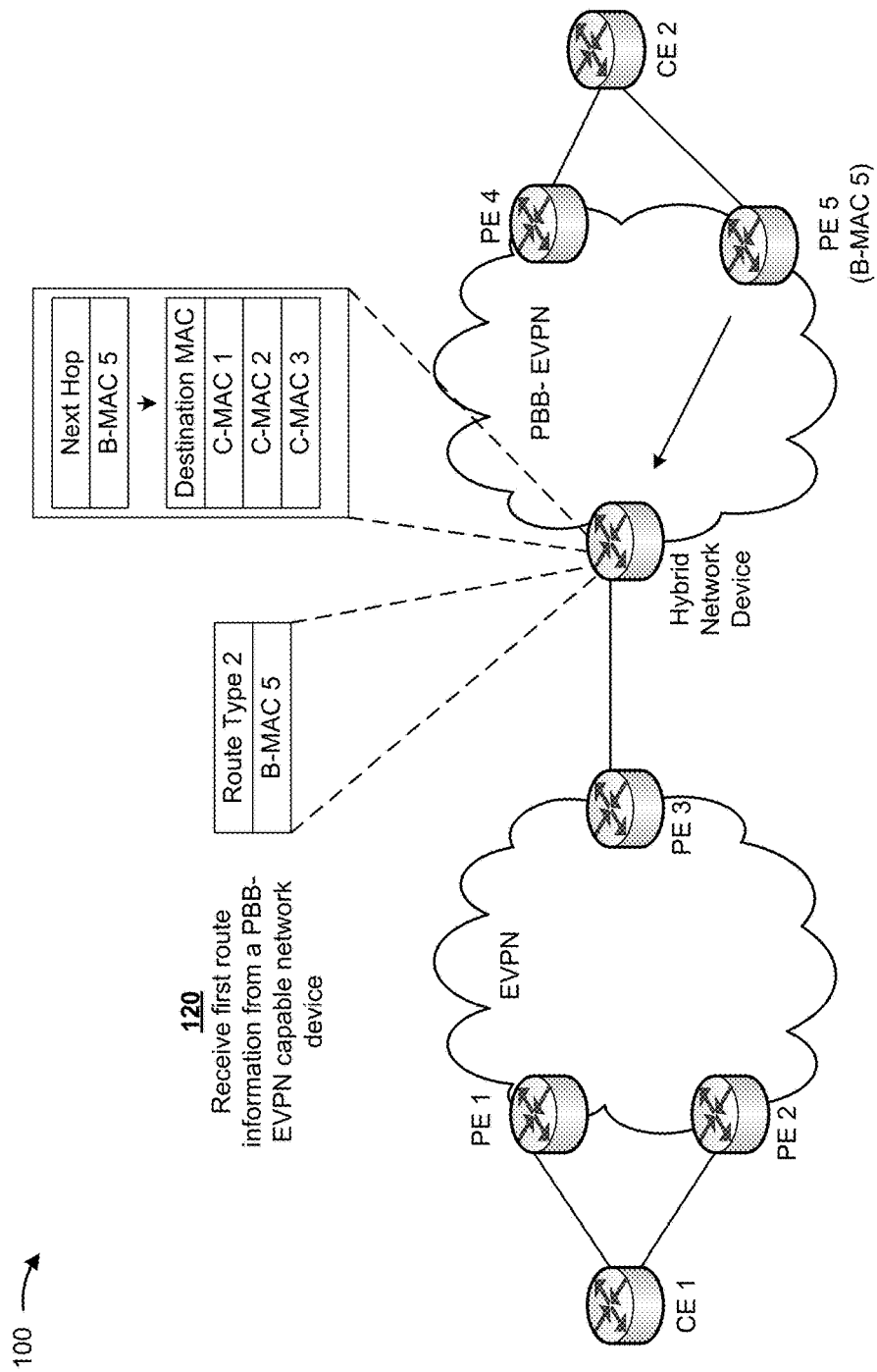

As shown in FIG. 1B, and by reference number 120, the hybrid network device may receive first route information from a PBB-EVPN capable network device (e.g., PE 5). For example, the first route information may include route type 2 information that includes a B-MAC address of PE 5 (e.g., B-MAC 5). In some implementations, the hybrid network device may learn, using a technique (e.g., a data plane learning technique), C-MAC addresses that are associated with B-MAC 5 (e.g., are reachable via PE 5). As an example, and as shown, assume that the hybrid network device identifies that a set of C-MAC addresses (e.g., C-MAC 1, C-MAC 2, and C-MAC 3) are associated with B-MAC 5. In this case, the hybrid network device may store, in a data structure, information that associates the set of C-MAC addresses and the B-MAC address.

Figure 1C:
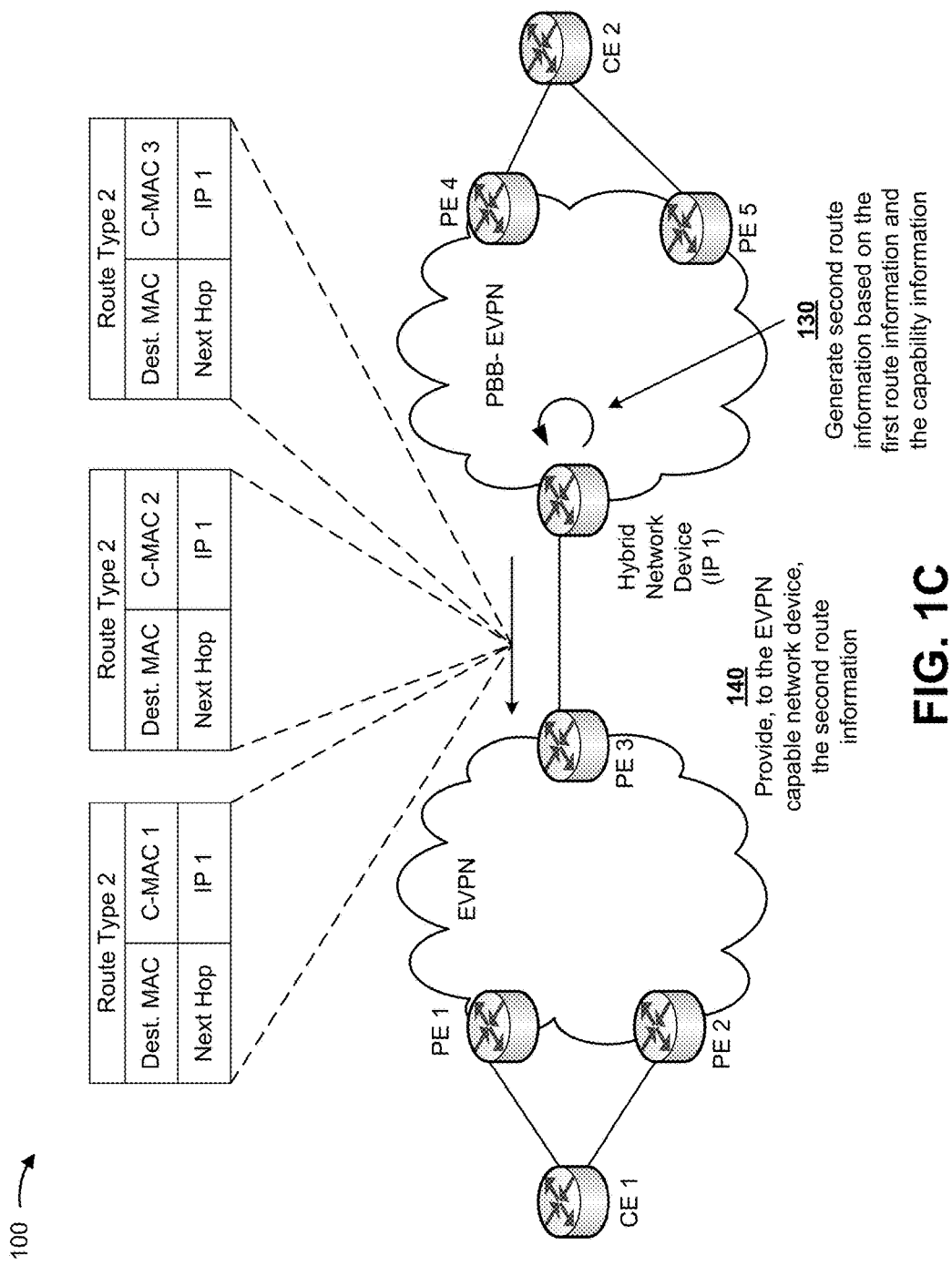

As shown in FIG. 1C, and by reference number 130, the hybrid network device may generate second route information based on the first route information and the capability information. For example, the hybrid network device may generate second route information that is capable of being provided to and/or processed by network devices of the EVPN. As shown, and as an example, the second route information may include route type 2 information that includes the set of C-MAC addresses, and that identifies that the hybrid network device (e.g., an IP address of the hybrid network device) is a next-hop for the set of C-MAC addresses.

As further shown in FIG. 1C, and by reference number 140, the hybrid network device may provide, to the EVPN capable network device (e.g., PE 3), the second route information. In some implementations, PE 3 may store, in a data structure, the second route information to permit PE 3 to provide network traffic to endpoint devices associated with the set of C-MAC addresses that are reachable via PE 5, as described below.

Figure 1D:
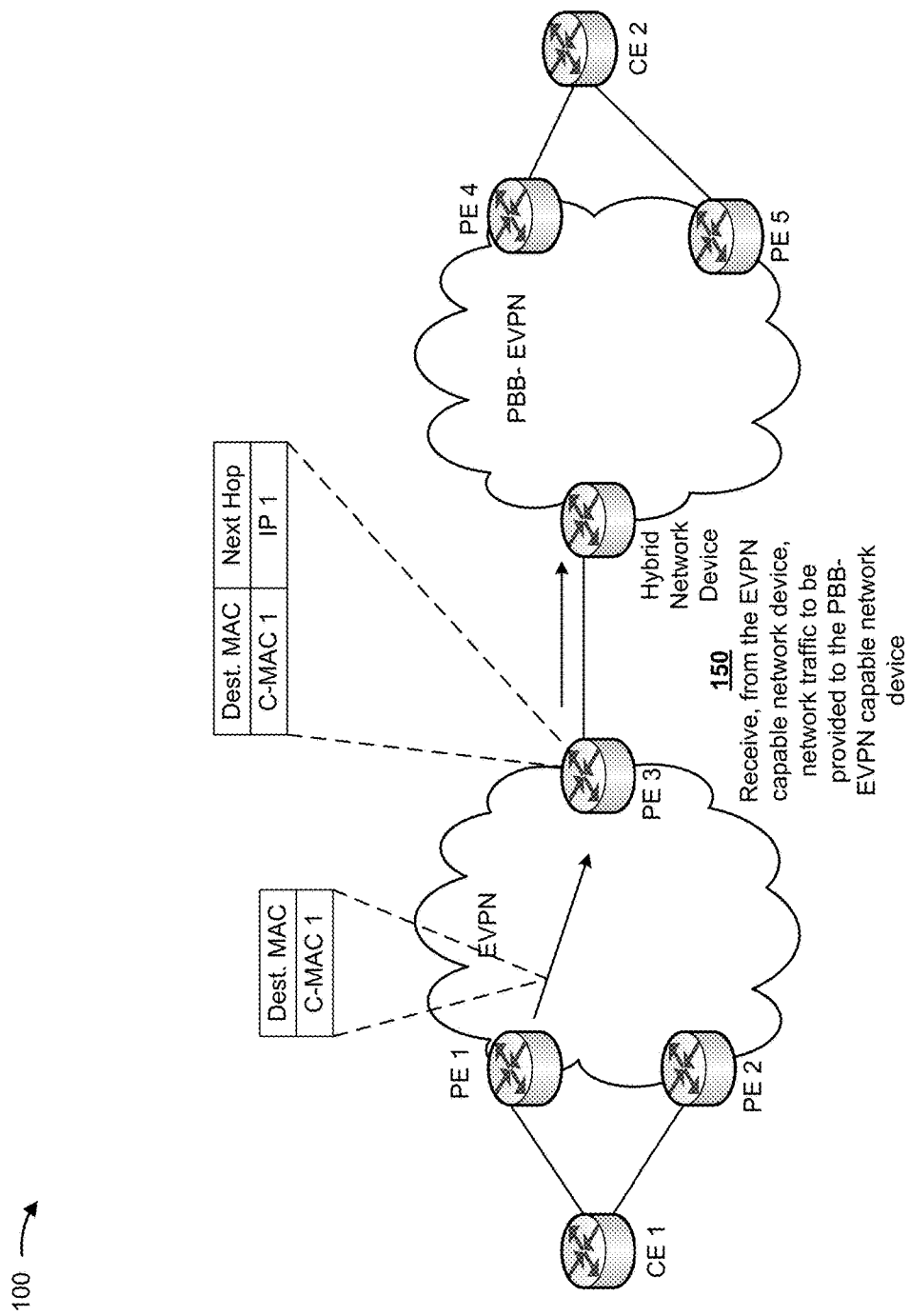

As shown in FIG. 1D, and by reference number 150, the hybrid network device may receive, from the EVPN capable network device (e.g., PE 3), network traffic to be provided to the PBB-EVPN capable network device (e.g., PE 5). For example, PE 1 may provide, to PE 3, unicast network traffic that includes a destination address of C-MAC 1. As shown, PE 3 may identify, using information stored in the data structure, that a next-hop for C-MAC 1 is the hybrid network device (e.g., IP 1). Additionally, PE 3 may provide, to the hybrid network device, the unicast network traffic.

Figure 1E:
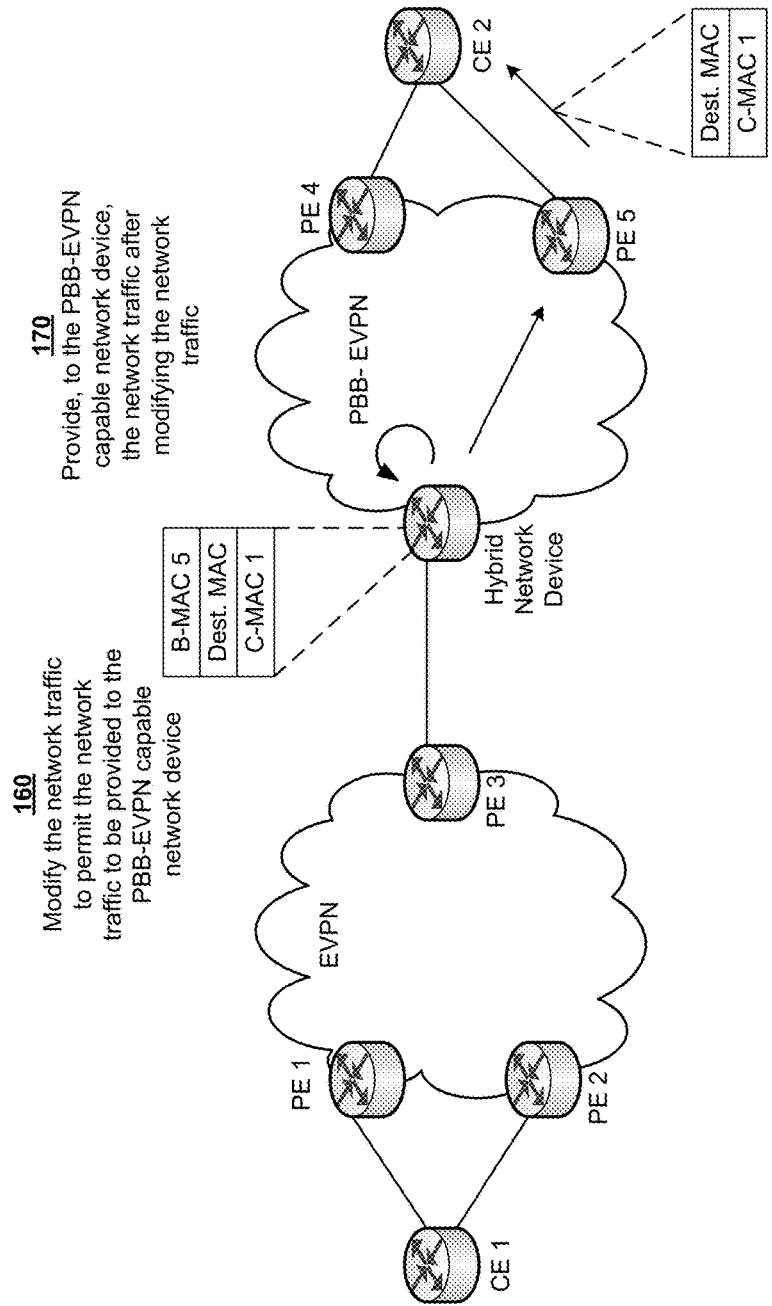

As shown in FIG. 1E, and by reference number 160, the hybrid network device may modify the network traffic to permit the network traffic to be provided to the PBB-EVPN capable network device. For example, the hybrid network device may search a data structure using destination address C-MAC 1, identify that B-MAC 5 is associated with C-MAC-1, and modify the network traffic to include information associated with B-MAC 5. For example, the hybrid network device may add PBB information to the unicast network traffic, such as information that identifies a source B-MAC address associated with the hybrid network device and a destination B-MAC address associated with PE 5 (e.g., B-MAC 5).

As further shown in FIG. 1E, and by reference number 170, the hybrid network device may provide, to the PBB-EVPN capable network device (e.g., PE 5), the network traffic after modifying the network traffic. For example, the hybrid network device may provide the modified network traffic to PE 5 after adding the PBB information to the unicast network traffic. As shown, PE 5 may receive the unicast network traffic, remove the PBB information, and identify that the destination address is C-MAC 1. Additionally, as shown, PE 5 may provide the unicast network traffic to CE 2.

In this way, some implementations described herein permit interconnection between EVPNs and PBB-EVPNs. In other words, some implementations described herein enable route information to be exchanged between network devices of EVPNs and PBB-EVPNs, and permit network traffic to be provided between EVPNs and PBB-EVPNs. In this way, some implementations described herein reduce an amount of configuration of network devices by enabling some network devices to implement EVPN protocols and other network devices to implement PBB-EVPN protocols (e.g., instead of requiring that each network device implement a particular protocol or both protocols).

As indicated above, FIGS. 1A-1E are provided merely as an example. Other examples are possible and may differ from what was described with regard to FIGS. 1A-1E.

Figure 2:
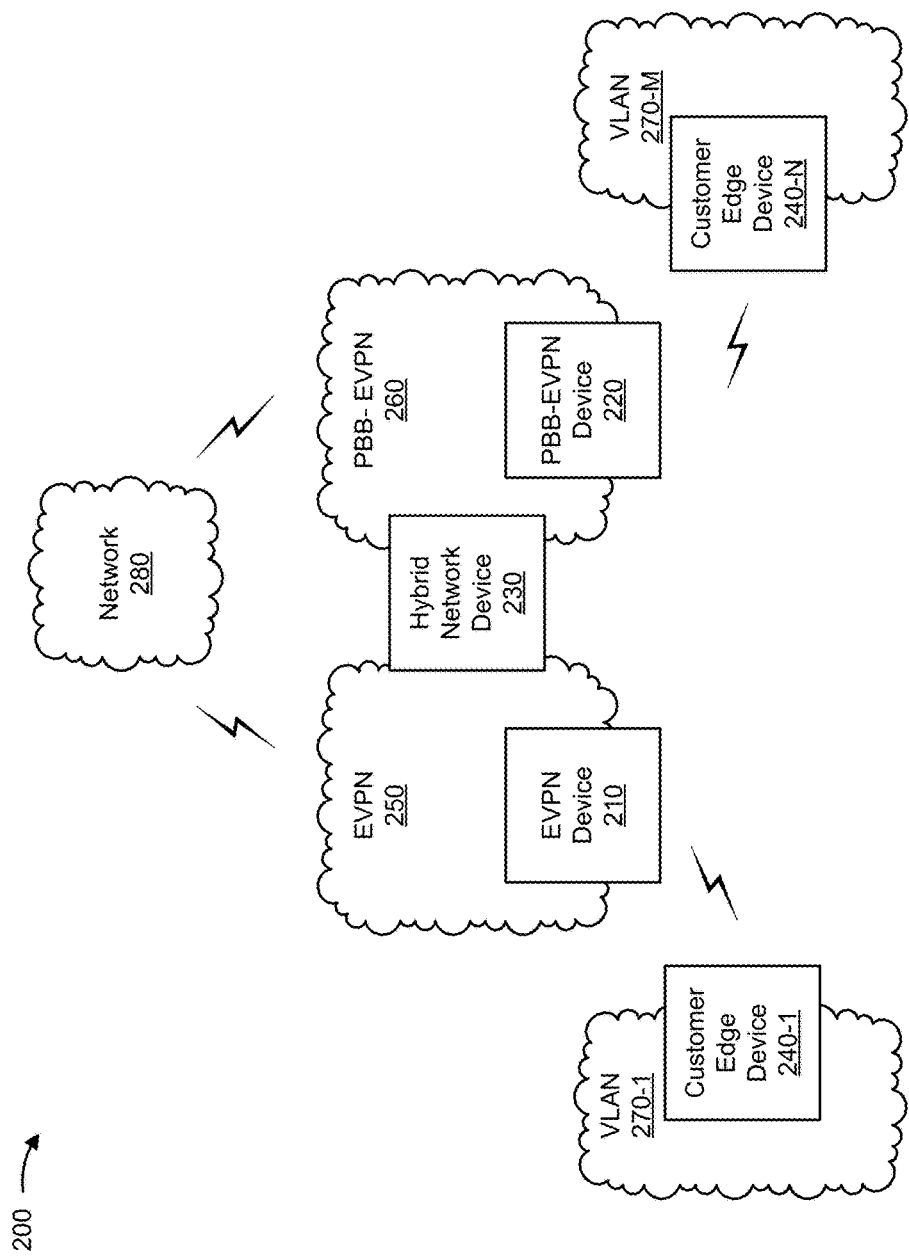
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an EVPN device 210, a PBB-EVPN device 220, a hybrid network device 230, one or more customer edge devices 240-1 through 240-N (N≥1) (hereinafter referred to collectively as "customer edge devices 240," and individually as "customer edge device 240"), an EVPN 250, a PBB-EVPN 260, one or more VLANs 270-1 through 270-M (M≥1) (hereinafter referred to collectively as "VLANs 270," and individually as "ULAN 270"), and a network 280. Devices of environment 200 may interconnect via wired connections, wireless connections, or a combination of wired and wireless connections.

EVPN device 210 includes one or more network devices (e.g., one or more traffic transfer devices) capable of processing and transferring network traffic (e.g., packets) associated with EVPN 250. For example, EVPN device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, EVPN device 210 is a provider edge device associated with EVPN 250. In some implementations, EVPN device 210 may be a physical device implemented within a housing, such as a chassis. In some implementations, EVPN device 210 may be a virtual device implemented by one or more computer devices of a cloud computing environment or a data center.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

PBB-EVPN device 220 includes one or more network devices capable of processing and transferring network traffic associated with PBB-EVPN 260. For example, PBB-EVPN device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, PBB-EVPN device 220 is a provider edge device associated with PBB-EVPN 260. In some implementations, PBB-EVPN device 220 may be a physical device implemented within a housing, such as a chassis. In some implementations, PBB-EVPN device 220 may be a virtual device implemented by one or more computer devices of a cloud computing environment or a data center.

Hybrid network device 230 includes one or more network devices capable of processing and transferring network traffic associated with EVPN 250 and PBB-EVPN 260. For example, hybrid network device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

In some implementations, hybrid network device 230 is a provider edge device associated with EVPN 250 and/or PBB-EVPN 260. In some implementations, hybrid network device 230 may be a physical device implemented within a housing, such as a chassis. In some implementations, hybrid network device 230 may be a virtual device implemented by one or more computer devices of a cloud computing environment or a data center.

In some implementations, hybrid network device 230 is included in EVPN 250. Alternatively, hybrid network device 230 is included in PBB-EVPN 260. Alternatively, hybrid network device 230 connects EVPN 250 and PBB-EVPN 260 despite being included in neither EVPN 250 or PBB-EVPN 260.

Customer edge device 240 includes one or more network devices capable of processing and transferring network traffic. For example, customer edge device 240 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 240 may be located on an edge of a customer premises, and may communicate with EVPN device 210, PBB-EVPN device 220, and/or hybrid network device 230 to gain access to a service provider's core network. Additionally, or alternatively, customer edge device 240 may communicate with one or more endpoint devices via a local area network (LAN) (e.g., VLAN 270) to provide the endpoint device(s) with access to the core network via EVPN device 210, PBB-EVPN device 220, and/or hybrid network device 230.

EVPN 250 includes a Layer 2 Virtual Private Network (VPN) that allows devices included in VLAN 270 to communicate with other devices included in VLAN 270 and/or another VLAN 270 using EVPN protocols. In some implementations, EVPN 250 may be provisioned by a service provider to provide point-to-multipoint (e.g., broadcast, unknown unicast, and/or multicast (BUM)) network traffic between endpoint devices (e.g., via EVPN device 210, hybrid network device 230 and/or customer edge device 240).

PBB-EVPN 260 includes a Layer 2 Virtual Private Network (VPN) that allows devices included in VLAN 270 to communicate with other devices included in VLAN 270 and/or another VLAN 270 using PBB-EVPN protocols. In some implementations, PBB-EVPN 260 may be provisioned by a service provider to provide point-to-multipoint network traffic between endpoint devices (e.g., via PBB-EVPN device 220, hybrid network device 230 and/or customer edge device 240).

VLAN 270 includes one or more wired and/or wireless networks. In some implementations, VLAN 270 may include a virtual LAN. In some implementations, VLAN 270 may include another type of LAN. In some implementations, endpoint devices associated with a customer premises may communicate with one another internally via VLAN 270. Additionally, or alternatively, the endpoint devices may communicate with external devices (e.g., not included in VLAN 270) via customer edge device 240, EVPN device 210, PBB-EVPN device 220, and/or hybrid network device 230. While shown as being included in separate VLANs 270, customer edge devices 240 may be included in a single VLAN 270, in some implementations.

Network 280 includes a network associated with routing and/or forwarding traffic provided via EVPN 250 and/or PBB-EVPN 260. For example, network 280 may a label switching (e.g., a multi-protocol label switching (MPLS)) based network, an internet protocol (IP) based network, and/or another type of network through which traffic, associated with EVPN 250, PBB-EVPN 260 and/or VLAN 270 may travel.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
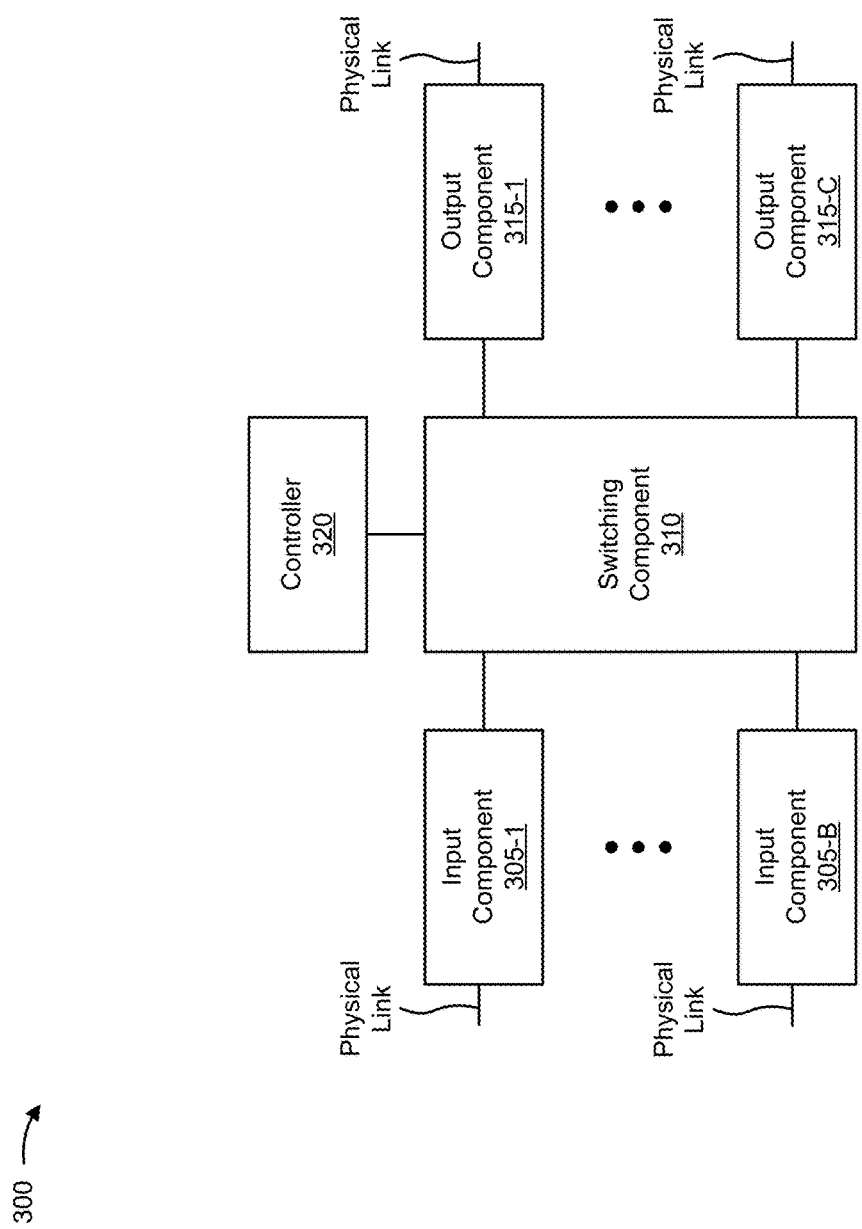
FIG. 3 is a diagram of example components of one or more devices of FIG. 2.

FIG. 3 is a diagram of example components of a device 300. Device 300 may correspond to EVPN device 210, PBB-EVPN device 220, hybrid network device 230, and/or customer edge device 240. In some implementations, EVPN device 210, PBB-EVPN device 220, hybrid network device 230, and/or customer edge device 240 may include one or more devices 300 and/or one or more components of device 300. In some implementations, device 300 may be implemented as a virtual device that is implemented within a cloud computing environment, such as implemented as a virtual machine that executes on one or more cloud computing devices (e.g., servers) in the cloud computing environment.

As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
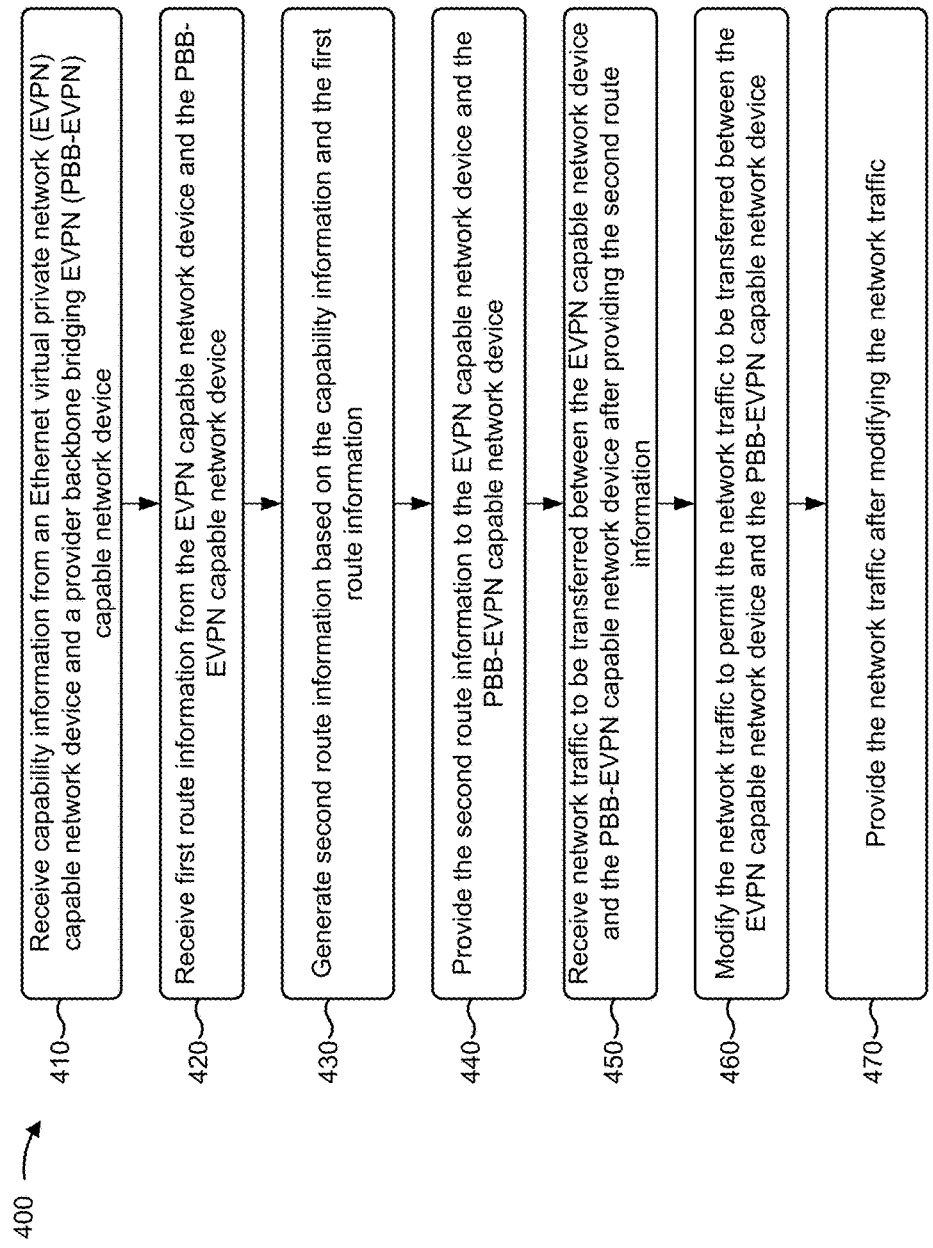
FIG. 4 is a flow chart of an example process for enabling interconnection between an EVPN and a PBB-EVPN.

FIG. 4 is a flow chart of an example process 400 for enabling interconnection between an EVPN and a PBB-EVPN. In some implementations, one or more process blocks of FIG. 4 may be performed by hybrid network device 230. In some implementations, one or more process blocks of FIG. 4 may be performed by another device or a group of devices separate from or including hybrid network device 230, such as EVPN device 210, PBB-EVPN device 220, and/or customer edge device 240.

As shown in FIG. 4, process 400 may include receiving capability information from an Ethernet virtual private network (EVPN) capable network device and a provider backbone bridging EVPN (PBB-EVPN) capable network device (block 410). For example, hybrid network device 230 may receive, from EVPN device 210 and PBB-EVPN device 220, capability information that identifies whether a network device is EVPN capable, PBB-EVPN capable, or EVPN capable and PBB-EVPN capable. In some implementations, EVPN device 210 and PBB-EVPN device 220 may be associated with the same EVPN instance (EVI).

In some implementations, hybrid network device 230 may receive, from EVPN device 210, route type 1 information that identifies that EVPN device 210 is EVPN capable. In some implementations, hybrid network device 230 may receive, from PBB-EVPN device 220, route type 1 information that identifies that PBB-EVPN device 220 is PBB-EVPN capable.

In some implementations, hybrid network device 230 may receive the capability information based on a request. For example, hybrid network device 230 may provide, to EVPN device 210 and PBB-EVPN device 220, respectively, requests for capability information. Alternatively, hybrid network device 230 may receive the capability information without having provided a request for the capability information, based on a configuration received from a network operator, or the like.

In some implementations, hybrid network device 230 may be both EVPN capable and PBB-EVPN capable. In this way, hybrid network device 230 may generate and exchange route information between EVPN device 210 and PBB-EVPN device 220 to permit network traffic to be transferred between customer sites that are connected to EVPN device 210 and PBB-EVPN device 220, respectively.

As further shown in FIG. 4, process 400 may include receiving first route information from the EVPN capable network device and the PBB-EVPN capable network device (block 420). For example, hybrid network device 230 may receive route type 2, 3, and/or 4 information from EVPN device 210 and/or PBB-EVPN device 220.

In some implementations, hybrid network device 230 may receive route information from EVPN device 210. For example, hybrid network device 230 may receive route type 2 information from EVPN device 210. In this case, the route type 2 information may include a C-MAC address of an endpoint device that is reachable via EVPN device 210, a network address of EVPN device 210, a set of labels (e.g., EVPN labels, MPLS labels, or the like) to be used to provide network traffic to EVPN device 210, or the like.

In some implementations, hybrid network device 230 may receive route type 3 information from EVPN device 210. In this case, the route 3 type information may include a VLAN ID associated with a customer site that is connected to EVPN device 210, a network address of EVPN device 210, a set of labels, or the like.

In some implementations, hybrid network device 230 may receive route type 4 information from EVPN device 210. In this case, the route 4 type information may include identifiers of Ethernet segments associated with EVPN device 210. As described elsewhere herein, hybrid network device 230 may use the route type 4 information to identify whether hybrid network device 230 and EVPN device 210 are multi-homed to a customer site (e.g., customer edge device 240).

In some implementations, hybrid network device 230 may store, in a data structure, the route information that was received from EVPN device 210. For example, hybrid network device 230 may store the route information in a MAC virtual routing and forwarding table (MAC-VRF table), a link layer forwarding table, a routing information base (RIB) table, a routing table, a forwarding table, a flow table, or a VRF table, or the like. As a specific example, hybrid network device 230 may store route information, such as a next-hop indicator that identifies a network address (e.g., an IP address, MAC address, or the like) of EVPN device 210 as a next-hop for a destination C-MAC address, a VLAN ID, or the like.

In some implementations, hybrid network device 230 may receive route information from PBB-EVPN device 220, and store the route information. For example, hybrid network device 230 may receive route type 2 information from PBB-EVPN device 220. In this case, the route type 2 information may include a B-MAC address of PBB-EVPN device 220.

In some implementations, hybrid network device 230 may learn, using a data plane learning technique (e.g., Institute of Electrical and Electronics Engineers (IEEE) 802.1x, link layer discovery protocol (LLDP), IEEE 802.1aq, address resolution protocol (ARP), or another technique), C-MAC addresses that are reachable via PBB-EVPN device 220. In some implementations, hybrid network device 230 may associate the C-MAC addresses and the B-MAC address, and store mapping information that maps the C-MAC addresses and the B-MAC address after associating the C-MAC addresses and the B-MAC address.

In some implementations, hybrid network device 230 may receive route type 3 information from PBB-EVPN device 220. In this case, the route type 3 information may include an I-SID associated with PBB-EVPN device 220. In some implementations, hybrid network device 230 may learn, using a data plane learning technique, VLAN IDs of VLANs 270 that are reachable via PBB-EVPN device 220. In some implementations, hybrid network device 230 may associate the VLAN IDs and the I-SID, and store mapping information that maps the VLAN IDs and the I-SID after associating the VLAN IDs and the I-SID.

In some implementations, hybrid network device 230 may receive the first route information based on periodic exchange of route information between EVPN devices 210 and/or PBB-EVPN devices 220, respectively. Additionally, or alternatively, hybrid network device 230 may receive the first route information based on a request. Additionally, or alternatively, hybrid network device 230 may receive the first route information based on a configuration (e.g., received from a network operator).

In this way, hybrid network device 230 may receive first route information from EVPN device 210 and PBB-EVPN device 220, respectively, thereby enabling hybrid network device 230 to generate second route information to permit reachability information, associated with the first route information, to be transferred between EVPN device 210 and PBB-EVPN device 220, as described below.

As further shown in FIG. 4, process 400 may include generating second route information based on the capability information and the first route information (block 430), and providing the second route information to the EVPN capable network device and the PBB-EVPN capable network device after modifying the route information (block 440). For example, hybrid network device 230 may generate second route information based on the capability information and the first route information, and may provide the second route information to EVPN device 210 and the PBB-EVPN device 220 after generating the second route information.

In some implementations, hybrid network device 230 may generate second route information, based on the first route information that was received from PBB-EVPN device 220, and provide the second route information to EVPN device 210. For example, hybrid network device 230 may provide, to EVPN device 210, route type 2 information that identifies C-MAC addresses that are reachable via PBB-EVPN device 220 (e.g., instead of providing route type 2 information that identifies a B-MAC address of PBB-EVPN device 220). Additionally, or alternatively, hybrid network device 230 may provide, to EVPN device 210, route type 3 information that identifies VLAN IDs of VLANs 270 that are reachable via PBB-EVPN device 220 (e.g., instead of providing route type 3 information that identifies an I-SID associated with PBB-EVPN device 220). In this way, EVPN device 210 may provide network traffic (e.g., unicast network traffic and/or BUM network traffic) to endpoint devices that are reachable via PBB-EVPN device 220.

In some implementations, hybrid network device 230 may generate second route information, based on the first route information that was received from EVPN device 210, and provide the second route information to PBB-EVPN device 220. For example, hybrid network device 230 may provide, to PBB-EVPN device 220, route type 2 information that identifies a B-MAC address of hybrid network device 230 (e.g., instead of providing route type 2 information that identifies C-MAC addresses that are reachable via EVPN device 210). Additionally, or alternatively, hybrid network device 230 may provide, to PBB-EVPN device 220, route type 3 information that identifies an I-SID associated with hybrid network device 230 (e.g., instead of providing route type 3 information that identifies VLAN IDs that are reachable via EVPN device 210). In this way, PBB-EVPN device 220 may learn, using data plane learning techniques, C-MAC addresses and/or VLAN IDs that are reachable via hybrid network device 230 and/or EVPN device 210.

In this way, hybrid network device 230 may generate second route information using the first route information received from EVPN device 210 or PBB-EVPN device 220, respectively. In other words, hybrid network device 230 may provide route information that is in conformance with EVPN signaling or PBB-EVPN signaling, respectively.

As further shown in FIG. 4, process 400 may include receiving network traffic to be transferred between the EVPN capable network device and the PBB-EVPN capable network device after providing the second route information (block 450), modifying the network traffic to permit the network traffic to be transferred between the EVPN capable network device and the PBB-EVPN capable network device (block 460), and providing the network traffic after modifying the network traffic (block 470). For example, hybrid network device 230 may receive network traffic to be transferred between the EVPN device 210 and PBB-EVPN device 220, may modify the network traffic to permit the network traffic to be transferred from EVPN device 210 to PBB-EVPN device 220, or vice versa, and may provide the network traffic after modifying the network traffic.

In some implementations, hybrid network device 230 may receive, from EVPN device 210, unicast network traffic that is to be provided to PBB-EVPN device 220. In some implementations, hybrid network device 230 may identify a destination C-MAC address based on the unicast network traffic, search a data structure using the destination C-MAC address, and identify that PBB-EVPN device 220 is the next-hop for the unicast network traffic (e.g., based on route type 2 information received from PBB-EVPN device 220).

In some implementations, hybrid network device 230 may modify the network traffic. For example, hybrid network device 230 may add PBB information to the unicast network traffic. In some implementations, the PBB information may include information that identifies a source B-MAC address (e.g., associated with hybrid network device 230) and a destination B-MAC address (e.g., associated with PBB-EVPN device 220).

In some implementations, hybrid network device 230 may modify the network traffic based on the capability information that was received from PBB-EVPN device 220. For example, hybrid network device 230 may add PBB information to the unicast network traffic based on the capability information that identifies that PBB-EVPN device 220 is capable of implementing a PBB-EVPN. In some implementations, hybrid network device 230 may provide the unicast network traffic to PBB-EVPN device 220 after adding the PBB information to the unicast network traffic.

In some implementations, hybrid network device 230 may receive, from EVPN device 210, BUM traffic that is to be provided to PBB-EVPN device 220. In some implementations, hybrid network device 230 may identify a VLAN ID based on the BUM network traffic, search a data structure using the VLAN ID, and identify that PBB-EVPN device 220 is a next-hop for the BUM network traffic (e.g., based on route type 3 information received from PBB-EVPN device 220).

In some implementations, hybrid network device 230 may modify the network traffic. For example, hybrid network device 230 may add PBB information to the BUM network traffic. In this case, the PBB information may include an I-SID associated with PBB-EVPN device 220. For example, hybrid network device 230 may identify an I-SID that is associated with the VLAN ID, and add PBB information that identifies the I-SID.

In some implementations, hybrid network device 230 may modify the BUM network traffic based on the capability information that was received from PBB-EVPN device 220. In some implementations, hybrid network device 230 may provide the BUM network traffic to PBB-EVPN device 220 after modifying the BUM network traffic.

In some implementations, hybrid network device 230 may receive, from PBB-EVPN device 220, unicast network traffic that is to be provided to EVPN device 210. In some implementations, hybrid network device 230 may receive unicast network traffic that includes PBB information (e.g., a source B-MAC address and a destination B-MAC address), modify the network traffic (e.g., to remove the PBB information), and identify a destination C-MAC address after modifying the PBB information. In this case, hybrid network device 230 may search a data structure using the destination C-MAC address, identify that EVPN device 210 is the next-hop for the C-MAC address (e.g., based on route type 2 information that was received from EVPN device 210), and provide, to EVPN device 210, the unicast network traffic.

In some implementations, hybrid network device 230 may receive, from PBB-EVPN device 220, BUM network traffic that is to be provided to EVPN device 210. In some implementations, hybrid network device 230 may receive the BUM network traffic that includes PBB information (e.g., an I-SID), modify the BUM network traffic (e.g., to remove the PBB information), and identify a VLAN ID. In this case, hybrid network device 230 may search a data structure using the VLAN ID, identify that EVPN device 210 is a next-hop for the VLAN ID (e.g., based on route type 3 information that was received from EVPN device 210), and provide, to EVPN device 210, the BUM network traffic.

In some implementations, hybrid network device 230 may determine that a customer edge device 240 is multi-homed to a set of EVPN devices 210. In some implementations, hybrid network device 230 may determine that a customer edge device 240 is multi-homed to a set of PBB-EVPN devices 220. For example, hybrid network device 230 may determine whether network devices are multi-homed based on route type 4 information. In either case, hybrid network device 230 may perform a technique, such as a load balancing technique, an aliasing technique, or the like, when providing network traffic to multi-homed network devices.

In some implementations, hybrid network device 230 may determine that a customer edge device 240 is multi-homed to hybrid network device 230 and EVPN device 210. In some implementations, hybrid network device 230 may determine that a customer edge device 240 is multi-homed to hybrid network device 230 and PBB-EVPN device 220. In either case, hybrid network device 230 may perform a designated forwarder election process with EVPN device 210 or PBB-EVPN device 220 to identify which device is to forward network traffic to the multi-homed customer edge device 240.

In this way, some implementations described herein enable route information and/or network traffic to be exchanged between network devices that are implementing different protocols (i.e., EVPN protocols or PBB-EVPN protocols).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a hybrid network device that is both EVPN capable and PBB-EVPN capable, and that may exchange route information and/or network traffic between EVPN PEs and PBB-EVPN PEs. In this way, some implementations described herein reduce an amount of configuration or re-configuration of network devices by enabling some network devices to use EVPN protocols and other network devices to use PBB-EVPN protocols while enabling interconnection between the network devices.

Some implementations described herein improve network performance by enabling interconnection between network devices that otherwise might not be capable of communicating. Additionally, some implementations described herein conserve network resources by reducing situations where network traffic, that might ultimately be dropped, is provided between EVPNs and PBB-EVPNs. In this way, some implementations described herein conserve processor and/or memory resources of network devices and conserve network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from an Ethernet virtual private network (EVPN) device, first capability information that identifies that the EVPN device is EVPN capable;
receive, from a provider backbone bridging EVPN (PBB-EVPN) device, second capability information that identifies that the PBB-EVPN device is PBB-EVPN capable;
receive first route information from at least one of the EVPN device or the PBB-EVPN device;
generate second route information based on the first route information and based on the first capability information and the second capability information;
provide the second route information to permit network traffic to be transferred between the EVPN device and the PBB-EVPN device;
receive the network traffic to be transferred between the EVPN device and the PBB-EVPN device after providing the second route information;
modify the network traffic, based on the first capability information and the second capability information, after receiving the network traffic; and provide the network traffic between the EVPN device and the PBB-EVPN device after modifying the network traffic.

2. The device of claim 1, where the one or more processors are further to:
identify a provider backbone media access control (B-MAC) address associated with the first route information,
the B-MAC address being associated with the PBB-EVPN device;
identify a set of customer media access control (C-MAC) addresses that is associated with the B-MAC address; and
where the one or more processors, when generating the second route information, are to:
generate the second route information to include the set of C-MAC addresses to permit unicast network traffic to be transferred between the EVPN device and the PBB-EVPN device.

3. The device of claim 1, where the one or more processors are further to:
identify a service instance identifier (I-SID) associated with the first route information, the I-SID being associated with the PBB-EVPN device;
identify a set of virtual local area network (VLAN) identifiers that is associated with the I-SID; and
where the one or more processors, when generating the second route information, are to:
generate the second route information to include the set of VLAN identifiers to permit broadcast, unknown unicast, or multicast network traffic to be transferred between the EVPN device and the PBB-EVPN.

4. The device of claim 1, where the one or more processors are further to:
receive, from the EVPN device, unicast network traffic that includes a destination C-MAC address,
the destination C-MAC address being reachable via the PBB-EVPN device;
identify a B-MAC address associated with the PBB-EVPN device based on the destination C-MAC address; and
where the one or more processors, when modifying the network traffic, are to:
modify the unicast network traffic to include the B-MAC address associated with the PBB-EVPN device.

5. The device of claim 1, where the one or more processors are further to:
receive, from the EVPN device, broadcast, unknown unicast, or multicast network traffic that includes a VLAN identifier,
a VLAN, associated with the VLAN identifier, being reachable via the PBB-EVPN device;
identify an I-SID associated with the PBB-EVPN device based on the VLAN identifier; and
where the one or more processors, when modifying the network traffic, are to:
modify the broadcast, unknown unicast, or multicast network traffic to include the I-SID associated with the PBB-EVPN device.

6. The device of claim 1, where the one or more processors are further to:
identify that a customer edge device is multi-homed to the EVPN device and another EVPN device;
perform a load balancing technique based on the customer edge device being multi-homed to the EVPN device and the other EVPN device; and
where the one or more processors, when providing the network traffic, are to:
provide the network traffic to the EVPN device based on performing the load balancing technique.

7. The device of claim 1, where the EVPN device and the PBB-EVPN device are associated with a same EVPN instance.

8. A non-transitory computer-readable medium storing instructions, the instructions comprising:
one or more instructions that, when executed by one or more processors of a network device, cause the one or more processors to:
receive, from an Ethernet virtual private network (EVPN) device, first capability information that identifies that the EVPN device is EVPN capable;
receive, from a provider backbone bridging EVPN (PBB-EVPN) device, second capability information that identifies that the PBB-EVPN device is PBB-EVPN capable;
receive first route information from at least one of the EVPN device or the PBB-EVPN device;
generate second route information based on the first route information, the first capability information, and the second capability information;
provide the second route information to permit network traffic to be transferred between the EVPN device and the PBB-EVPN device;
receive the network traffic to be transferred between the EVPN device and the PBB-EVPN device after providing the second route information;
modify the network traffic to be compatible with the EVPN device or the PBB-EVPN device after receiving the network traffic; and
provide the network traffic between the EVPN device and the PBB-EVPN device after modifying the network traffic.

9. The non-transitory computer-readable medium of claim 8, where the one or more instructions, that cause the one or more processors to receive the first route information, cause the one or more processors to:
receive the first route information that includes a customer media access control (C-MAC) address that is associated with an endpoint device that is reachable via the EVPN device; and
where the one or more instructions, when generating the second route information, are to:
generate the second route information to include a provider backbone (B-MAC) address associated with the network device to permit the PBB-EVPN device to provide unicast network traffic to the endpoint device associated with the C-MAC address via the network device.

10. The non-transitory computer-readable medium of claim 8, where the one or more instructions, that cause the one or more processors to receive the first route information, further cause the one or more processors to:
receive the first route information that includes a virtual local area network (VLAN) identifier associated with the EVPN device; and
where the one or more instructions, that cause the one or more processors to generate the second route information, cause the one or more processors to:
generate the second route information to include a service instance identifier (I-SID) associated with the network device to permit the PBB-EVPN device to provide broadcast, unknown unicast, or multicast network traffic to the EVPN device via the network device.

11. The non-transitory computer-readable medium of claim 8, where the one or more instructions, that cause the one or more processors to modify the network traffic, cause the one or more processors to:
    modify the network traffic based on removing PBB information associated with unicast network traffic.

12. The non-transitory computer-readable medium of claim 8, where the one or more instructions, that cause the one or more processors to modify the network traffic, cause the one or more processors to:
    modify the network traffic based on removing PBB information from broadcast, unknown unicast, or multicast traffic.

13. The non-transitory computer-readable medium of claim 8, where the one or more instructions, when executed by the one or more processors, further cause the one or more processors to:
    determine that a customer edge device is multi-homed to the network device and the EVPN device; and
    perform a designated forwarder election process with the EVPN device after determining that the customer edge device is multi-homed to the network device and the EVPN device.

14. The non-transitory computer-readable medium of claim 8, where the one or more instructions, when executed by the one or more processors, further cause the one or more processors to:
    identify a provider backbone media access control (B-MAC) address associated with the first route information,
        the B-MAC address being associated with the PBB-EVPN device;
    identify a set of customer media access control (C-MAC) addresses that is associated with the B-MAC address; and
    where the one or more instructions, that cause the one or more processors to generate the second route information, cause the one or more processors to:
        generate the second route information to include the set of C-MAC addresses to permit unicast network traffic to be transferred between the EVPN device and the PBB-EVPN device.

15. A method, comprising:
    receiving, by a device and from an Ethernet virtual private network (EVPN) device, first capability information that identifies that the EVPN device is EVPN capable;
    receiving, by the device and from a provider backbone bridging EVPN (PBB-EVPN) device, second capability information that identifies that the PBB-EVPN device is PBB-EVPN capable;
    receiving, by the device, first route information from at least one of the EVPN device or the PBB-EVPN device;
    generating, by the device, second route information based on the first route information the first capability information, and the second capability information;
    providing, by the device, the second route information to permit network traffic to be transferred between the EVPN device and the PBB-EVPN device;
    receiving, by the device, the network traffic to be transferred between the EVPN device and the PBB-EVPN device after providing the second route information;
    modifying, by the device, the network traffic after receiving the network traffic; and
    providing, by the device, the network traffic to the EVPN device or to the PBB-EVPN device after modifying the network traffic.

16. The method of claim 15, where modifying the network traffic comprises:
    modifying the network traffic based on removing provider backbone bridging (PBB) information from the network traffic after receiving the network traffic.

17. The method of claim 15, where modifying the network traffic comprises:
    modifying the network traffic by adding the provider backbone bridging information to the network traffic.

18. The method of claim 15, further comprising:
    identifying a set of customer media access control (C-MAC) addresses that is associated with a provider backbone media access control (B-MAC) address,
        the B-MAC address being associated with the PBB-EVPN device; and
    where providing the second route information comprises:
        providing the second route information to the EVPN device to permit the EVPN device to provide the network traffic to an endpoint device associated with a C-MAC address of the set of C-MAC addresses.

19. The method of claim 15, further comprising:
    identifying a set of virtual local area network (VLAN) identifiers that is associated with a service instance identifier (I-SID),
        the I-SID being associated with the PBB-EVPN device; and
    where providing the second route information comprises:
        providing the second route information to the EVPN device to permit the EVPN device to provide the network traffic to an endpoint device associated with a VLAN identifier of the set of VLAN identifiers.

20. The method of claim 15, further comprising:
    identifying a provider backbone media access control (B-MAC) address associated with the first route information,
        the B-MAC address being associated with the PBB-EVPN device;
    identifying a set of customer media access control (C-MAC) addresses that is associated with the B-MAC address; and
    where generating the second route information comprises:
        generating the second route information to include the set of C-MAC addresses to permit unicast network traffic to be transferred between the EVPN device and the PBB-EVPN device.

\* \* \* \* \*